United States Patent
Köllner et al.

(10) Patent No.: US 7,778,185 B2
(45) Date of Patent: Aug. 17, 2010

(54) METHOD FOR THE TRANSMISSION OF DATA USING SELF-DIAGNOSTIC PULSE WIDTH MODULATION

(75) Inventors: Wolfgang Köllner, Vienna (AT); Ludwik Waskiewicz, Vösendorf (AT)

(73) Assignee: Continental Automotive GmbH, Hannover (DE)

( * ) Notice: Subject to any disclaimer, the term of this patent is extended or adjusted under 35 U.S.C. 154(b) by 69 days.

(21) Appl. No.: 12/097,322

(22) PCT Filed: Nov. 28, 2006

(86) PCT No.: PCT/EP2006/068977
§ 371 (c)(1),
(2), (4) Date: Oct. 10, 2008

(87) PCT Pub. No.: WO2007/068581
PCT Pub. Date: Jun. 21, 2007

(65) Prior Publication Data
US 2009/0052315 A1 Feb. 26, 2009

(30) Foreign Application Priority Data
Dec. 15, 2005 (DE) ........................ 10 2005 060 025

(51) Int. Cl.
*H04L 12/26* (2006.01)
(52) U.S. Cl. ........................ 370/241; 709/208
(58) Field of Classification Search .................. 370/241, 370/249, 247; 709/203, 208, 209, 227, 228, 709/230, 232, 236, 237, 238
See application file for complete search history.

(56) References Cited

U.S. PATENT DOCUMENTS

| | | | | |
|---|---|---|---|---|
| 5,140,611 A | * | 8/1992 | Jones et al. | 375/219 |
| 5,548,732 A | * | 8/1996 | Hoashi et al. | 710/105 |
| 5,758,098 A | | 5/1998 | Townsley et al. | 395/282 |
| 6,188,314 B1 | | 2/2001 | Wallace et al. | 340/438 |
| 6,777,825 B1 | | 8/2004 | Swart et al. | 307/10.1 |
| 7,606,955 B1 | * | 10/2009 | Falik et al. | 710/110 |
| 2004/0208200 A1 | | 10/2004 | Hejdeman et al. | 370/476 |

FOREIGN PATENT DOCUMENTS

| | | |
|---|---|---|
| DE | 19909535 | 3/1999 |
| DE | 10140037 | 8/2001 |
| EP | 1443709 | 7/2001 |

* cited by examiner

*Primary Examiner*—Brenda Pham
(74) *Attorney, Agent, or Firm*—King & Spalding, L.L.P.

(57) ABSTRACT

In a method for transmitting data between a master control unit and a slave control unit, the master control unit (4) outputs a pulse width-modulated signal (7) at an output terminal (HI_LO_BUS) in order to transmit the same to the slave control unit (5) via a bus (6). The method includes the steps: —the slave control unit (5) generates an acknowledgement signal at periodic acknowledgement intervals (TQuitt); —the slave control unit (5) influences the pulse width-modulated signal (7) transmitted on the bus (6) during the acknowledgement interval (TQuitt); —the master control unit (4) detects the influenced pulse width-modulated signal (7), the pulse width-modulated signal (7) output at the output signal terminal (HI_LO_BUS) being read back at an input signal terminal (Read_Back_Bus) of the master control unit (4).

20 Claims, 3 Drawing Sheets

Circuit Arrangement of an Open-Collector Single Wire Interface

PWM-Signal

PWM-Signal with Acknowledge by slave During $T_{Quitt}$

PWM-Signal with Acknowledge by slave During $T_{High3}$

METHOD FOR THE TRANSMISSION OF DATA USING SELF-DIAGNOSTIC PULSE WIDTH MODULATION

CROSS-REFERENCE TO RELATED APPLICATIONS

This application is a U.S. national stage application of International Application No. PCT/EP2006/068977 filed Nov. 28, 2006, which designates the United States of America, and claims priority to German application 10 2005 060 025.5 filed Dec. 15, 2005, the contents of which are hereby incorporated by reference in their entirety.

TECHNICAL FIELD

The invention relates to a method for the transmission of data between a master control unit and a slave control unit, with the master control unit outputting a pulse width-modulated signal at an output terminal in order to transmit the same to the slave control unit via a bus.

BACKGROUND

Modern motor vehicles are equipped with networked control devices, between which a plurality of data relating both to the state of the electrical and also to the state of the mechanical components of the motor vehicle is transmitted. Pulse width modulation (PWM) has particularly proven its worth as a transmission method as a result of its simplicity and immunity to interference within motor vehicles.

One application is for instance the transmission of control information for fan or pump motors, in which a pulse width-modulated control signal is generated in a master control device and transmitted via a bus, frequently a single wire line, to a slave control device which is locally remote from the master control device. The control devices generally contain microcontrollers, which have a self-diagnostic function. In the event of a fault, the fault message can occur for instance from a slave control device to a master control device, such that the slave control device pulls the electrical potential on the line of the single wire interface down to earth potential during a specific period. As a result, the master control device, which constantly monitors the voltage level on the single wire line, identifies the fault notified by the slave control device. The length of time allows different faults to be encoded, so that the master control device can take actions which are tailored to the fault. Such an action can consist for instance in the entire system being put into a more secure state. If the master control device is networked in a superordinate bus, in a controller area network (CAN) for instance, it can signal the fault on a display device in the passenger compartment and/or can save it in a fault storage device in the motor vehicle for later diagnosis purposes.

The disadvantage here is that the initiative comes from the slave control device, so that if the slave control device fails, the master control device constantly assumes that the system is in a fault-free operating state. This fault recognition is inadequate and can have far-reaching consequences depending on the type of controller. If the fan motor in an engine cooling system fails, without corresponding actions being taken, this can result in overheating and in some instances in damage to the internal combustion engine.

SUMMARY

A method can be specified with the aid of which faults can be recognized more successfully than previously during a transmission of data from a master control device to a slave control device by means of a pulse width-modulated signal.

According to an embodiment, a method for the transmission of data between a master control unit and a slave control unit, may comprise the steps of: —the master control unit outputting a pulse width-modulated signal at an output terminal in order to transmit the same to the slave control unit via a bus, —slave control unit generating an acknowledgement signal at periodic acknowledgement intervals; —the slave control unit influencing the pulse width-modulated signal transmitted on the bus during the acknowledgement interval; —the master control unit detecting the influenced pulse width-modulated signal, wherein the pulse width-modulated signal output at the output signal terminal being read back at an input signal terminal of the master control unit.

According to a further embodiment, an information parameter of at least one pulse of the pulse width-modulated signal can be influenced during the acknowledgement interval. According to a further embodiment, the amplitude of the at least one pulse may be selected as an information parameter and the acknowledgement signal may almost completely suppress the amplitude during the acknowledgement interval. According to a further embodiment, the pulse duration may be selected as an information parameter of the at least one pulse and is changed by the acknowledgment signal. According to a further embodiment, the pulse duration may be shortened by the acknowledgement signal in accordance with the acknowledgment interval. According to a further embodiment, the pulse duration may be interrupted by the acknowledgment signal during the acknowledgment interval. According to a further embodiment, the bus may be formed by a single-wire line. According to a further embodiment, the pulse width-modulated signal may be output continuously by the master control unit. According to a further embodiment, the slave control unit may have a self-diagnostic device, by means of which a fault-free state of the slave control unit can be determined. According to a further embodiment, the slave control unit may read the pulse width-modulated signal at an input terminal and outputs the acknowledgment signal at an output terminal. According to a further embodiment, a circuit arrangement may be used to output the acknowledgment signal, said circuit arrangement being connected on the output side to the bus and on the input side to the output terminal of the slave control unit. According to a further embodiment, the slave control unit may output an acknowledgement signal in the event of the identified fault-free state, in which the acknowledgement interval is discretely assigned to a fault image, with the fault image having been determined previously by the slave control unit. According to a further embodiment, the pulse width-modulated signal may be output with a pulse duty factor of approximately 10 percent to 90 percent. According to a further embodiment, the reading-back of the pulse width-modulated signal may be implemented simultaneously with each output of a pulse of the pulse width-modulated signal. According to a further embodiment, the reading-back of the pulse width-modulated signal may be implemented simultaneously in order to output an acknowledgement signal. According to a further embodiment, the master control device may be connected to a superordinate bus, particularly preferably a CAN bus, and via this bus displays a fault message on a display panel in the passenger compartment and/or stores it in a fault storage device.

BRIEF DESCRIPTION OF THE DRAWINGS

In order to describe the invention further, reference is made to the drawings in the subsequent part of the description, in which further advantageous embodiments, details and developments of the invention can be inferred, in which.

DETAILED DESCRIPTION

Figure 1:
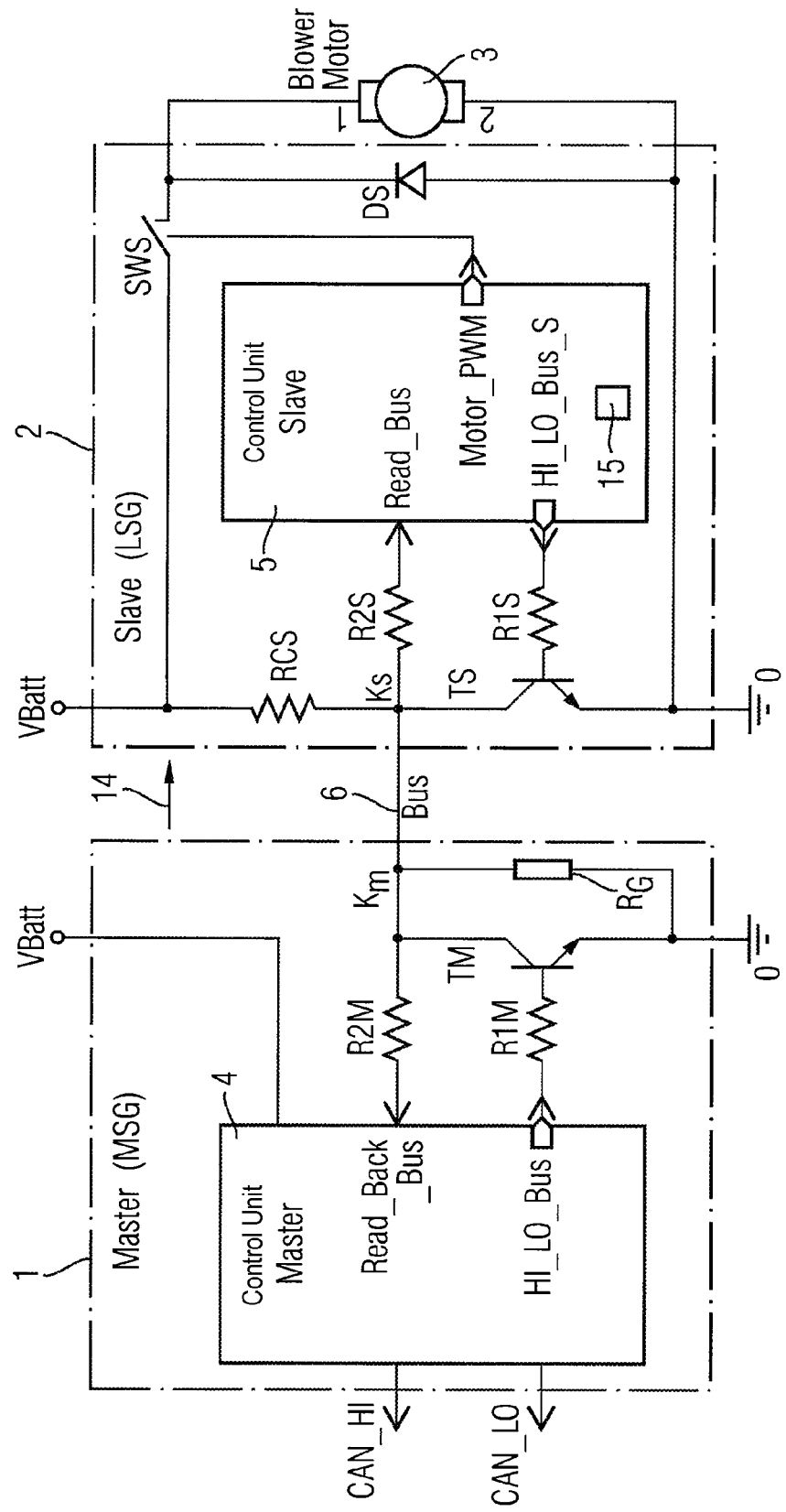
FIG. 1 shows a circuit arrangement with an open collector single-wire interface, as is usual for the control of a fan motor in a motor vehicle for instance.

According to various embodiments, a periodic feedback signal is provided, in which the slave control unit influences the pulse width-modulated signal transmitted by the master control unit at regular intervals. Or in other words, the slave control device does not only transmit in the event of a fault, but instead transmits a confirmation, an acknowledgment signal at periodic intervals. This initiative comes from the slave control device here. The master control unit observes the signal state at the bus by reading back the output PWM signal. As a result, it also detects the periodic acknowledgment signal from the slave control device. In the event of a fault, the acknowledgement signal no longer occurs at the bus and the master control device recognizes that a fault has occurred during the transmission and/or conversion of information.

The method according to an embodiment has the following steps:
  the slave control unit generates an acknowledgement signal at periodic acknowledgement intervals;
  the slave control unit influences the pulse width-modulated signal transmitted on the bus during the acknowledgement interval;
  the master control unit detects the influenced pulse width-modulated signal, with the pulse width-modulated signal output at the output signal terminal being read back at an input signal terminal of the master control device.

In other words, the acknowledgment signal corresponds to a fault-free feedback signal. If the acknowledgement signal is missing, the master control unit assumes a faulty conversion of the transmitted information or data and may take actions for the fault. One particular advantage of the various embodiments results from the fact that the signaling possibilities for faults which are currently available in motor vehicles, (open-collector-bus-driver circuit) can be used without changes in various embodiments. In the case of motor vehicle devices which are available, only the procedure for signaling a fault changes and not however the hardware. Only one new algorithm needs to be implemented.

One embodiment variant can be characterized in that an information parameter of at least one pulse of the pulse width-modulated signal is influenced during an acknowledgement interval. Both the amplitude and also the duration of a pulse width-modulated pulse can be information parameters.

In a preferred embodiment of the method, provision can be made for the amplitude of the PWM signal to be used and for the amplitude to be almost completely suppressed during the acknowledgement interval by means of the acknowledgment signal. As a result, the various embodiments can be particularly easily implemented in practice.

Another embodiment can be configured such that the amplitude of a PWM pulse is interrupted by means of the acknowledgment signal during a pulse duration through the acknowledgment interval.

One particularly cost-effective development can be characterized in that the bus is formed by means of a simple single wire line.

It can be advantageous for the pulse width-modulated signal to be continuously output by the master control unit and transmitted to the slave control unit.

The system is then particularly reliable if the slave control unit has a self-diagnostic device, by means of which it is able to self-diagnose its operating state. If it also has a possibility of monitoring the load under its control, the acknowledgment signal of the master control unit signals a fault-free operating state for the system components arranged downstream of the master control device (bus, driver circuit, slave control unit and load connected downstream thereof).

In a particularly preferred variant, provision can be made for the influencing of the pulse width-modulated signal to occur such that the fault image is encoded by means of influencing, so that a different response to the fault can be assumed on the part of the master control unit. As a result, a pinpointed fault can be displayed. On the basis of this information, it is easier for a superordinate control system to transfer the overall system into a more secure state in an appropriate fashion.

FIG. 1 shows a schematic representation of a circuit arrangement as is usual in a motor vehicle to control the power flow in a fan or in a fuel pump.

A master control device ("MSG") 1 forms a data source which is connected to a slave control device ("LSG") 2 (data sink) via a bidirectional bus 6. Both devices 1, 2 are powered by the motor vehicle battery ("VBatt", "0"). The slave control device 2 controls the fan 3. The master control device 1 has a master control unit 4, which is connected on the input side to a CAN bus (in FIG. 1 terminals "CAN_HI" and "CAN_LO"). The pulse width-modulated signal generated in the master control unit 1, also abbreviated to PWM signal below, is continually output at an output ("HI_LO_Bus") and reaches the base of the transistor "TM" by way of the resistor "R1M". The collector of the transistor "TM" is connected to the one end of the single-wire interface 6 in node "KM". The resistor "RG" connects the node "KM" to the earth (0) of the car battery. The other end of the single-wire interface 6 is connected to a node "KS" of the slave control device 2 and to VBatt by way of the resistor "RCS". It follows that RG>>RCS.

The slave control device 2 has a slave control unit 5 with an input ("Read-Bus"). The pulse width-modulated signal reaches this input "Read-Bus" by way of the resistor "R2S".

The master control unit 4 and the slave control unit 5 are modules which process information, which are embodied in the present exemplary embodiment as 1-chip microcontrollers and which have a self-diagnostic device 15. This self-diagnostic device 15 allows each module 4, 5, to identify and signal emerging faults or faults which have already occurred. This self-diagnostic device 15 is known per se in the case of computing systems and does not need to be illustrated in further detail here.

The PWM signal transmitted on the single-wire interface 6 is transmitted with a sampling ratio of between 10 and 90 percent, in other words, a transmission of information from the master control unit 4 to the slave control unit 5 takes place continuously.

As apparent from the schematic representation in FIG. 1, the slave control unit 5 generates a control signal for the semi-conductor power switch "SWS" at an output "Motor_PWM", which clocks the armature current of the fan motor 3. As a result, and as was already mentioned in the introduction, the power input, in other words the cooling effect of the motor, is controlled by the information of the PWM signal which is contained in the pulse duration. In the circuit diagram in FIG. 1, a freewheeling diode "DS" is connected in parallel with the fan motor 3.

According to various embodiments, an acknowledgement signal, in other words a fault-free message, is now generated at periodic intervals by the slave control unit 5. This acknowledgement signal influences the pulse width-modulated signal at bus 6. The master control device 1 detects this influence, by reading back the potential at bus 6 either at the same time as the transmission of a pulse of the PWM signal or during the duration of the acknowledgement signal. The acknowledgement signal is output at the output HI_LO_BUS_S of the slave control unit 5 and reaches the bus by way of "R1S" and the switching transistor "TS". The transistor "TM" arranged in the master control device 1 is connected to an open collector circuit, so that the signal at the bus 6 can be influenced by the acknowledgement signal existing at node "KS" on the part of the slave control device 2. In the present example, this means that if the transistor "TS" is through-connected, the potential on the single wire interface 6 is pulled down to zero volts irrespective of the switching state of the transistor "TM".

The method according to various embodiments is similar in terms of procedure to that of a "watchdog", as is usual in computer systems. There the software informs the "Watchdog" at regular intervals that it is still operating correctly. In the present case, the slave control unit 5 informs the master control unit 1 at regular recurring intervals about an operating state, which contains the following in the present exemplary embodiment:

the acknowledgement signal firstly contains a statement regarding the information transmission from the master control device 1 to the slave control device 2, in other words a receive confirmation relating to the proper reception of the pulse width-modulated signal.

secondly, the acknowledgment signal also contains a statement relating to the functional state of the slave control device 1, since the acknowledgement signal is only then generated if the slave control unit 5 has determined its own fault-free state after passing through a self-diagnostic routine, thirdly, the master control unit 4 is also signaled by way of the acknowledgement message that the load controlled by the slave control unit 5, in the present exemplary embodiment the fan motor 3, is achieving the predetermined cooling power. FIG. 1 does not shown the monitoring of the cooling function in more detail. It can take place for instance by means of sensors, which detect the movement of the fan wheel, the motor current or the temperature in the cooling circuit. As a result, a blocked or sluggish fan motor shaft is identified.

The various embodiments can be hugely advantageous in that during its realization, the circuit arrangement (open-collector single-wire interface in FIG. 1) which is conventionally used in motor vehicles can be retained for the realization of the method; a change in the procedure and not however in the circuit is only required.

Figure 3:
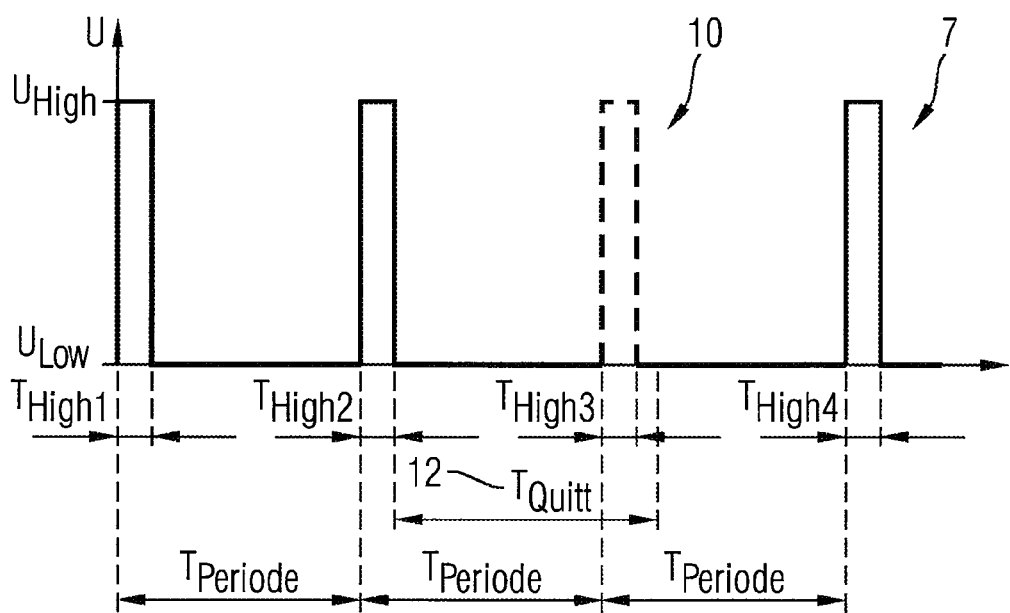
FIG. 3 shows a signal pattern of a pulse width-modulated signal according to a first embodiment, in which a pulse is suppressed by means of the acknowledgement signal.

The acknowledgement interval is measured such that according to a first embodiment of the method, a PWM pulse is completely suppressed in a periodically recurring fashion (see FIG. 3, missing "high-pulse" 10 during the time "THigh3"). This embodiment only places a slight demand on the transmission bandwidth between the devices 1, 2 and is preferably used in motor vehicle fan controllers.

Figure 4:
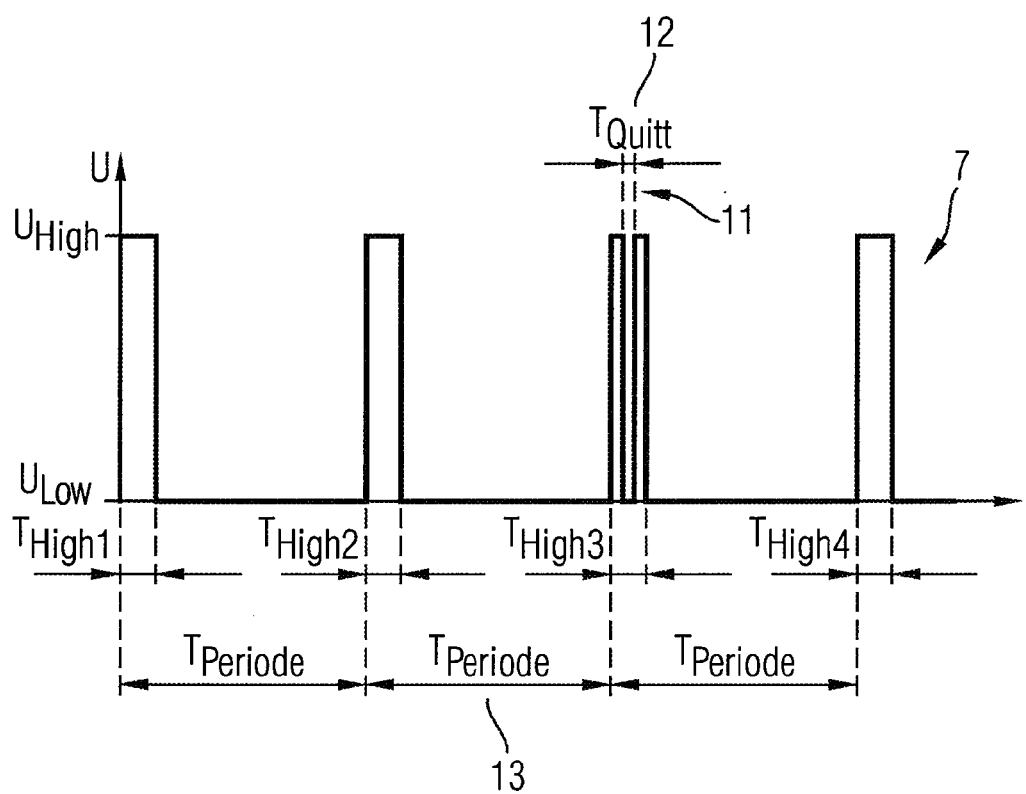
FIG. 4 shows a signal pattern of a pulse width-modulated signal according to a second embodiment, in which a pulse is interrupted by the acknowledgement signal during an acknowledgement time.

The influence can however also consist in a pulse being interrupted during periodically recurring acknowledgement intervals (see FIG. 4, the time "THigh" of a pulse is drawn to earth during the acknowledgement interval "TQuitt"). This embodiment is preferably used in motor vehicle fuel pump controllers. It is naturally also conceivable for another signal parameter of the pulse width-modulated signal, for instance the amplitude of a pulse, not to be completely suppressed.

The detection of the acknowledgement signal by means of the master control unit 4 takes place by reading back the voltage level at bus 6. The master control unit 4 has an input "Read_Back_Bus" for this, which is connected to the node KM and thus to the bus 6 by way of the resistor "RZM".

In the event of an interruption in the single-wire line 6, the signal read back by the master control unit 4 is at earth potential. In this way, a line break can also be detected by the master control device 1 and assigned. As already mentioned above, the reading back can either take place at the same time as each transmitted PWM pulse, or during the period of the acknowledgment signal. In the latter case, the algorithm in the master control unit 4 knows the period of the acknowledgement signal.

If the acknowledgement signal is available periodically, the master control unit 4 assumes that the information transmitted thereby via the pulse width-modulation to the slave control device 2 was received and is also correctly converted into a cooling effect.

If by contrast the acknowledgement signal is missing in the back-read signal, the master control unit 4 assumes a fault state. This fault state is firstly not specified in more detail. The prerequisite that the bus 6 is not interrupted and the slave control unit 5 itself is functional can however induce a differentiation during the further course on the basis of the pulse duration of the acknowledgement signal. To this end, the slave control unit 5 encodes the fault by assigning the faults detected in each instance of a specific duration of the acknowledgement interval. (In this way, the time assigned to the fault is very much larger than the period duration of the PWM signal). The master control unit, which reads back the bus level and thus the time assigned to the fault, can detect the fault in a differentiated manner. As further action they can issue messages tailored to the fault at the CAN_HI and CAN_LO terminals or can initiate countermeasures.

Figure 2:
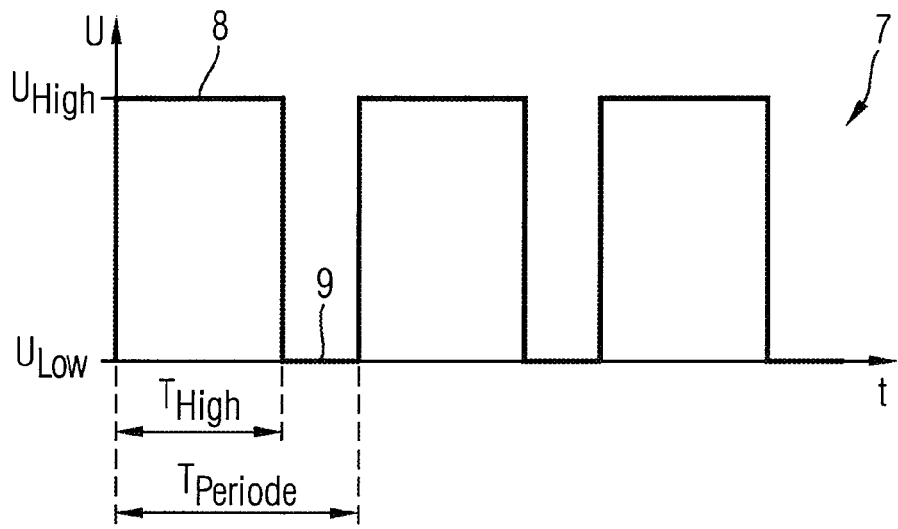
FIG. 2 shows a pulse diagram of a pulse width-modulated signal.

FIG. 2 shows the pulse width-modulated signal transmitted on the single wire interface 6 from the master control unit 4 to the slave control unit 5 as a pulse diagram as a function of time t. The frequency of the signal amounts to a few kHz. The electrical potential of the pulse lies between the low voltage level 9 (ULow) and the high voltage level 8 (UHigh). The transmitted data, i.e. information are encoded in the pulse duty factor. The pulse duty factor is calculated from the quotients Thigh/TLow. The pulse duty factor is varied between approximately 1 percent (fan power is zero) to 90 percent (maximum fan power). This ensures that a continuous data transmission takes place from the master control device 1 to the slave control device 2.

In a first embodiment, the signal pattern of FIG. 3 shows a pulse diagram of the PWM signal 7 in which a pulse is hidden by means of the superimposed acknowledgement signal (dashed line pulse 10 in FIG. 3). In this instance, the acknowledgement time is greater than the period duration TPeriode of the pulse width-modulated signal 7.

The signal pattern in FIG. 4 shows a second embodiment, in which the acknowledgement signal influences a pulse 11 of the PWM signal 7 such that this is interrupted in the High Phase during the acknowledgement time 12 (TQuitt). In this instance, the acknowledgement time TQuitt is less than Thigh.

It is clear to the person skilled in the art that the acknowledgement signal can influence the PWM signal 7 in a manner different to that shown in FIG. 3 or 4. It is conceivable for instance for this influence to consist in the acknowledgement signal changing the pulse amplitude according to the fault image. The two control units 4, 5 can naturally also be embodied differently, for instance by means of ASIC modules. It is also conceivable with suitable addressing for several data sinks to be connected at the bus.

In the present example, the bus 6 consists of one individual line. Naturally the method according to various embodiments is not restricted to a specific bus, but the bus 6 can be seen generally as a communication channel between the control units 4, 5, which can also be realized differently.

SUMMARY OF REFERENCE CHARACTERS USED

1. Master control device
2. Slave control device
3. Fan
4. Master control unit
5. Slave control unit
6. Single-wire interface
7. PWM signal
8. High level of the PWM signal
9. Low level of the PWM signal
10. Acknowledgement signal in the form of a suppressed high level
11. Acknowledgement signal in the form of an interrupted high level
12. Acknowledgement interval
13. Period duration of the PWM signal
14. Arrow
15. Self-diagnostic device

The invention claimed is:

1. A method for the transmission of data between a master control unit and a slave control unit, the method comprising the steps of:
   the master control unit outputting a pulse width-modulated signal at an output terminal in order to transmit the same to the slave control unit via a bus,
   slave control unit an acknowledgement signal at periodic acknowledgement intervals;
   the slave control unit influencing the pulse width-modulated signal transmitted on the bus during the acknowledgement interval;
   the master control unit detecting the influenced pulse width-modulated signal, the pulse width-modulated signal output at the output signal terminal being read back at an input signal terminal of the master control unit.

2. The method according to claim 1, wherein an information parameter of at least one pulse of the pulse width-modulated signal is influenced during the acknowledgement interval.

3. The method according to claim 2, wherein the amplitude of the at least one pulse is selected as an information parameter and the acknowledgement signal almost completely suppresses the amplitude during the acknowledgement interval.

4. The method according to claim 2, wherein the pulse duration is selected as an information parameter of the at least one pulse and is changed by the acknowledgment signal.

5. The method according to claim 4, wherein the pulse duration is shortened by the acknowledgement signal in accordance with the acknowledgment interval.

6. The method according to claim 4, wherein the pulse duration is interrupted by the acknowledgment signal during the acknowledgment interval.

7. The method according to claim 1, wherein the bus is formed by a single-wire line.

8. The method according to claim 1, wherein the pulse width-modulated signal is output continuously by the master control unit.

9. The method according to claim 1, wherein the slave control unit has a self-diagnostic device, by means of which a fault-free state of the slave control unit can be determined.

10. The method according to claim 7, wherein the slave control unit reads the pulse width-modulated signal at an input terminal and outputs the acknowledgment signal at an output terminal.

11. The method according to claim 10, wherein a circuit arrangement is used to output the acknowledgment signal, said circuit arrangement being connected on the output side to the bus and on the input side to the output terminal of the slave control unit.

12. The method according to claim 8, wherein the slave control unit outputs an acknowledgement signal in the event of the identified fault-free state, in which the acknowledgement interval is discretely assigned to a fault image, with the fault image having been determined previously by the slave control unit.

13. The method according to claim 1, wherein the pulse width-modulated signal is output with a pulse duty factor of approximately 10 percent to 90 percent.

14. The method according to claim 1, wherein the reading-back of the pulse width-modulated signal is implemented simultaneously with each output of a pulse of the pulse width-modulated signal.

15. The method according to claim 1, wherein the reading-back of the pulse width-modulated signal is implemented simultaneously in order to output an acknowledgement signal.

16. The method according to claim 1, wherein the master control device is connected to a superordinate bus, particularly preferably a CAN bus, and via this bus displays a fault message on a display panel in the passenger compartment and/or stores it in a fault storage device.

17. A method for the transmission of data between a master control unit and a slave control unit, comprising the steps of:
   outputting a pulse width-modulated signal by the master control unit at an output terminal to the slave control unit via a single wire bus,
   generating an acknowledgement signal by the slave control unit at periodic acknowledgement intervals during which the pulse width-modulated signal are influenced by the slave control unit;
   detecting the influenced pulse width-modulated signal by the master control unit, wherein the pulse width-modulated signal output at the output signal terminal being read back at an input signal terminal of the master control unit.

18. The method according to claim 17, wherein an information parameter of at least one pulse of the pulse width-modulated signal is influenced during the acknowledgement interval.

19. The method according to claim 18, wherein the amplitude of the at least one pulse is selected as an information parameter and the acknowledgement signal almost completely suppresses the amplitude during the acknowledgement interval.

20. A system for the transmission of data between a master control unit and a slave control unit, comprising:

the master control unit being operable to output a pulse width-modulated signal at an output terminal to the slave control unit via a bus, the slave control unit being operable to generate an acknowledgement signal at periodic acknowledgement intervals during which the pulse width-modulated signal are influenced by the slave control unit;

the master control unit being further operable to detect the influenced pulse width-modulated signal, wherein the pulse width-modulated signal output at the output signal terminal is read back at an input signal terminal of the master control unit.

* * * * *